INVENTOR.
Wright K. Gannett,
BY
Attys.

United States Patent Office 3,137,760
Patented June 16, 1964

3,137,760
STEREOSCOPIC VIEWER
Wright K. Gannett, Davenport, Iowa, assignor, by mesne assignments, to the United States of America as represented by the Secretary of the Navy
Filed Mar. 12, 1962, Ser. No. 179,262
4 Claims. (Cl. 88—29)

The present invention relates to a stereoscopic viewer for viewing film that is being projected.

Many stereoscopes use cut or separate films in which the separate left and right pictures of the stereogram may be individually moved to correct for such things as skew, field rotation, and overlap. However, in combination projectors and stereoscopic viewers, uncut film must be used, and, consequently, the stereoscope controls are more complex.

In the present invention, all the stereoscope controls are designed to be independent of one another so that the changing of any one control will not disturb any other control. Two separate optical systems are provided, one for each eye. In the middle of each system there is provided a lens and prism assembly that is positioned in a gimbal mounted barrel. Each assembly "looks at" at separate picture on a film that is located in the projector housing by means of a mirror arrangement. Each assembly forms an image of the picture being viewed in the viewing plane of a corresponding eyepiece. Rotation of the lens-prism assembly rotates the picture image and likewise vertical and horizontal motion of the lens-prism assembly produces corresponding corrective motions at the images. Individual controls are provided in the present invention to correct for skew, rotate the lens-prism assembly in order to angularly align the left image to the right and to rotate both images equally and together to find maximum stereo, adjust overlap, and change interocular. The overlap mechanism is interlocked with interocular so that any change in the interocular provides a corrective movement into the overlap mechanism in order to prevent any change of overlap as seen by the operator through the eyepieces. Changes of overlap, likewise, causes no change in the interocular setting.

It is therefore a general object of the present invention to provide improved controls for stereoscopic viewer.

Another object of the present invention is to provide various controls for a stereoscopic viewer wherein a change in one control does not affect the other controls.

Still another object of the present invention is to provide in a stereoscope a control for overlap that is interlocked with the interocular control so that a change in the interocular control provides a corrective movement in the overlap control.

Other objects and advantages of the present invention will be readily appreciated as the same becomes better understood by reference to the following detailed description when considered in connection with the accompanying drawings wherein:

FIGURE 5 is a partial sectional view showing a splined shaft and coupling.

Figure 1:
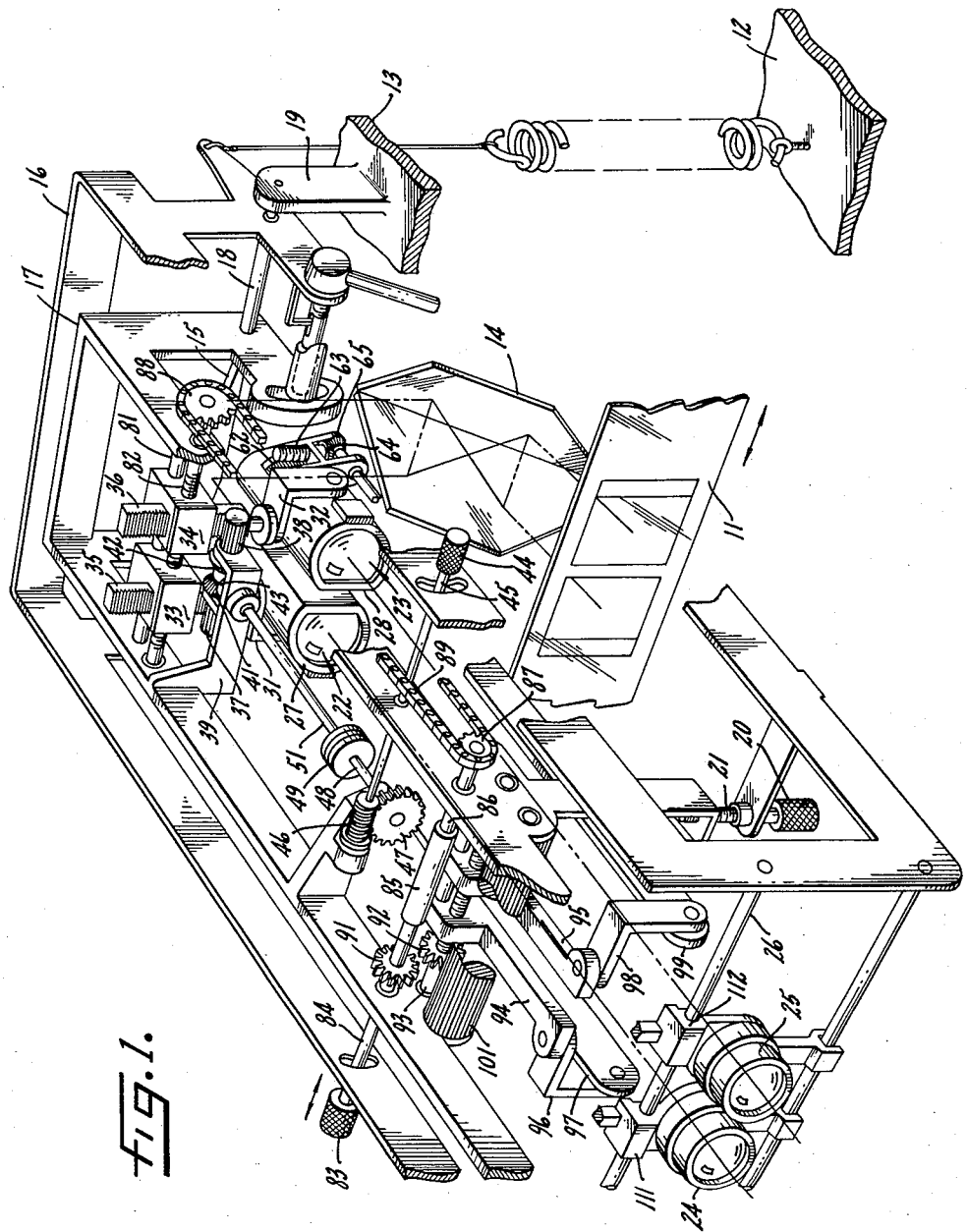
FIGURE 1 is a perspective view, partly broken away, showing an embodiment of the present invention.

Referring now to the drawings, wherein like reference characters designate like or corresponding parts throughout the several views, there is shown the stereoscope controls for a stereoscopic viewer. Stereoscopic film 11 is supported between housing plates 12 and 13 and the images on the film are projected by means of mirrors 14 and 15.

An outer housing 16 is provided, and an inner housing 17 is pivotally mounted on shaft 18 which passes through inner housing 17 near one end and through outer housing 16. Shaft 18 is supported by brackets 19 which are attached to housing plate 13. The other end of inner housing 17 is supported on a jack screw 21 which is retained in outer housing 16 and which threadedly engages with inner housing 17. Rotation of jack screw 21 causes inner housing 17 to be pivoted about shaft 18. A pair of lens-prism assemblies 22 and 23 are gimbal mounted to the inner housing 17 and a pair of eyepieces 24 and 25 are slidably mounted on a shaft 26 which is attached to the outer housing 16. Each lens-prism assembly is comprised of a Dove prism mounted between two lenses with all three pieces being mounted in an inner barrel that is rotatably mounted within an outer gimbal mounted barrel.

Skew Control

The purpose of the skew control is to adjust the heights of the lens-prism assemblies relative to each other so that the longitudinal axes of the lens-prism assemblies lie in the same horizontal plane. The outer barrels 27 and 28 of lens-prism assemblies 22 and 23 are mounted in gimbals 31 and 32, respectively, and gimbals 31 and 32 are mounted to carriages 33 and 34 by means of vertical stems 35 and 36, respectively. Stems 35 and 36 are each provided with rack teeth that engage with spline gears 37 and 38. Spline gears 37 and 38 are supported by U-shaped bracket 39 that is attached to inner housing 17, and miter gears 41 and 42 are provided on the ends of spline gears 37 and 38, respectively. Gear 43 meshes with miter gears 41 and 42. Gear 43 can be rotated by turning knob 44 which drives through shaft 45, worm 46, worm gear 47, shaft 48, flexible coupling 49 and shaft 51. Rotation of gear 43 causes gears 41 and 42 to be rotated in opposite directions and, consequently, stems 35 and 36 always travel in opposite directions, that is, for example, when stem 35 is traveling downwardly, stem 36 will be traveling upwardly.

Rotation Control

The rotation control performs two functions. When the rotation knob 61 is in its normally "out" position, rotation of knob 61 angularly aligns the left image to the right image due to rotation of the optics in the left lens-prism assembly 22. When knob 61 is pushed in and rotated, lens-prism assemblies 22 and 23 are both rotated equally and together to find maximum stereo.

Figure 2:
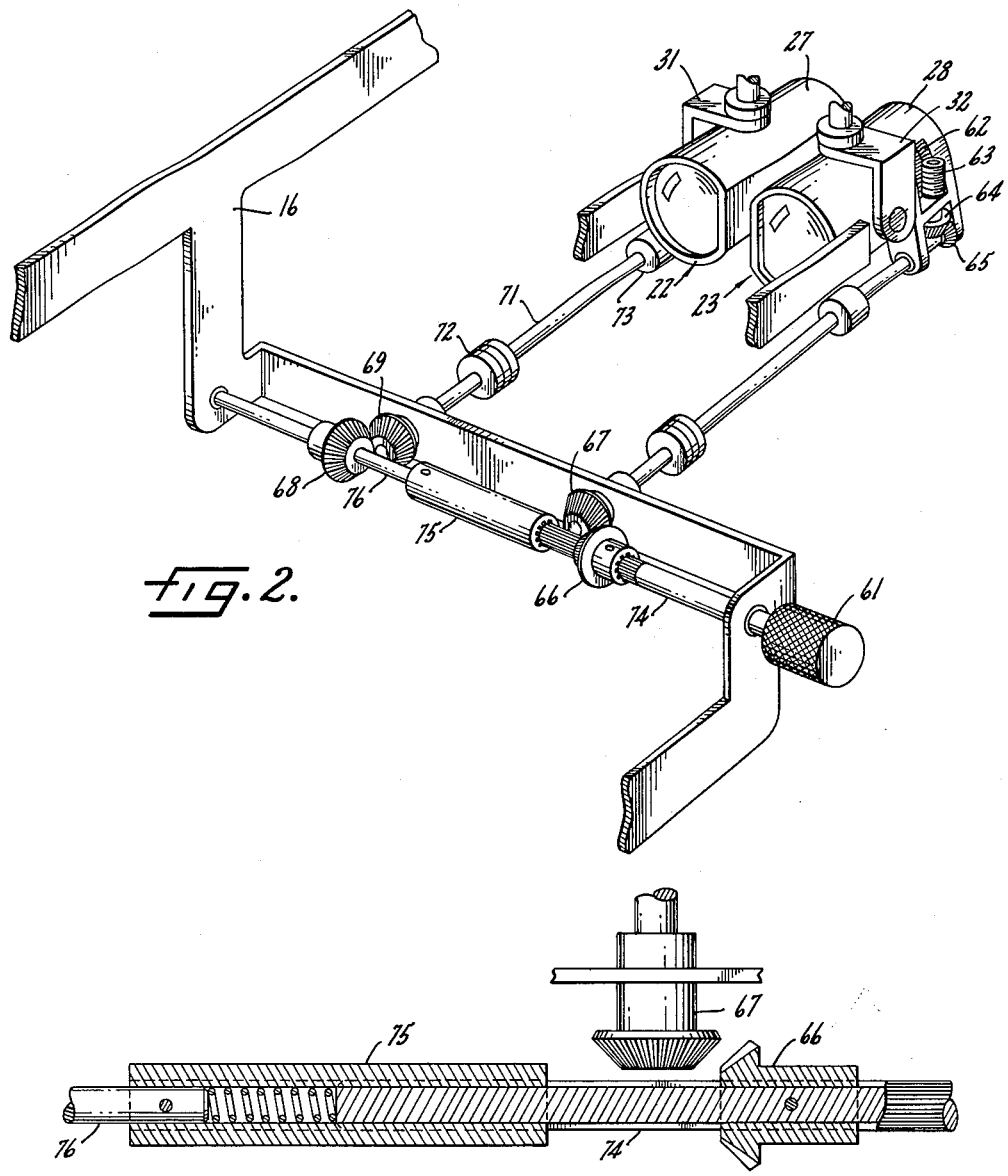
FIGURE 2 is a partial perspective view showing controls for rotating a lens-prism assembly.

Referring now to FIGURES 2 and 5 of the drawings, a worm wheel 62 is provided on the inner barrel of each lens-prism assembly and meshing with each worm wheel is a worm 63 that is rotated by means of miter gears 64 and 65. When knob 61 is in an "out" position, miter gears 66 and 67 are not engaged, as shown in FIGURE 5 of the drawing, and rotation of knob 61 causes only the left lens-prism assembly 22 to be rotated by means of gears 68 and 69, shaft 71 and flexible couplings 72 and 73. When knob 61 is pushed "in" gears 68 and 69 remain engaged and, in addition, gears 66 and 67 become engaged. Rotation of knob 61 will then cause both the left and right lens-prism assemblies to be rotated. As shown in FIGURE 5 of the drawing, shaft 74 is provided with a splined end that engages with coupling 75 to drive shaft 76 and also permits an inward and outward travel of shaft 74.

Overlap Control

The purpose of the overlap control is to adjust the barrel gimbals so as to point the left and right optical axes at those points on the film that the operator wishes to "pipe up" to the centers of the image gimbals for inspection through the eyepieces. The overlap mechanism is interlocked with interocular (separation of the eyepieces) so that change in the interocular feeds a corrective movement into the overlap mechanism in order to prevent a change of overlap as seen by the operator through the eyepieces. Change of overlap, likewise, causes no change in the interocular setting.

As described in the description of the skew controls, the outer barrels 27 and 28 which contain the left and right lens-prism assemblies are mounted in gimbals which in turn are supported by carriages 33 and 34. The carriages are supported by shafts 81 and 82 with shaft 81 being stationarily attached to inner housing 17 and shaft 82 being rotatably supported by inner housing 17. Shaft 82 has two threaded portions, one portion engaging with carriage 33 and the other portion engaging with carriage 34. The two threaded portions are threaded in opposite directions so that rotation of shaft 82 will cause carriages 33 and 34 to move in opposite directions and at the same rate of travel. Movement of carriages 33 and 34 is controlled by knob 83 which is attached to shaft 84. Rotation of knob 83 rotates shaft 84, coupling 85, shaft 86, and sprocket 87. Sprocket 88, which is attached to one end of shaft 82, is driven by sprocket 87 through sprocket chain 89, and rotation of shaft 82 causes lateral movement of carriages 33 and 34 and, consequently, lateral movement of lens-prism assemblies 22 and 23.

Shaft 84 is provided with a splined end which engages with coupling 85 in a manner similar to the coupling of shaft 74 in coupling 75, as shown in FIGURE 5 of the drawings. When knob 83 is pushed in, gear 91 on shaft 84 engages gear 92 on shaft 93, and rotation of knob 83 rotates both sprocket 87 and gear 92. When knob 83 is pulled out, gears 91 and 92 are disengaged and rotation of knob 83 will only rotate sprocket 87.

Interocular Control

The function of the interocular control is to regulate the spacing between the eyepieces 24 and 25, and, in addition, the interocular control is interlocked with the overlap control so that a change of the interocular control will not change overlap. As explained above, when knob 83 is pushed in, gear 91 on shaft 84 engages gear 92 on shaft 93. Rotation of knob 83 will, therefore, cause rotation of shaft 93. Shaft 93 has two threaded portions, one portion engaging with gimbal arm 94 and the other portion engaging with gimbal arm 95. The two threaded portions are threaded in opposite directions so that rotation of shaft 93 will cause gimbal arms 94 and 95 to move in opposite directions and at the same rate of travel. Gimbal arm 94 is connected to outer barrel 27 of lens-prism assembly 22 through link 96 and arm 97, and likewise, gimbal arm 95 is connected to outer barrel 28 of lens-prism assembly 23 through link 98 and arm 99.

Figure 3:
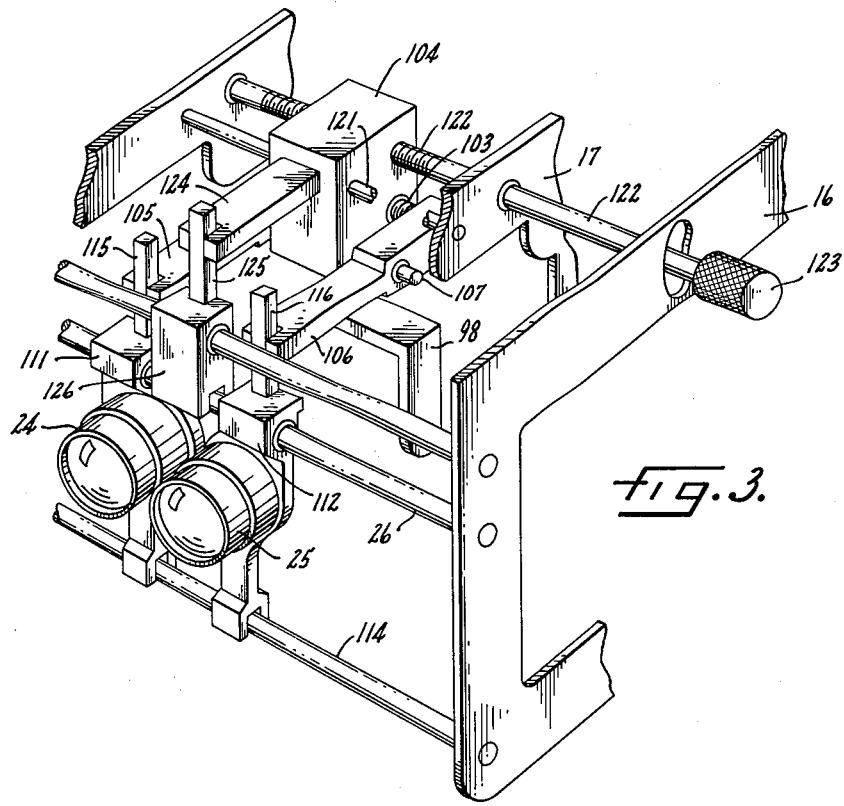
FIGURE 3 is a partial perspective view showing controls for interocular.
Figure 4:
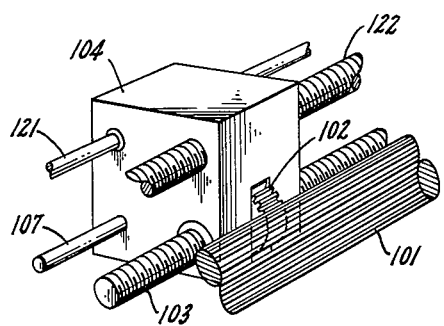
FIGURE 4 is a perspective view showing a scan carriage.

Gear 92, which is attached to shaft 93, engages with wide pinion gear 101 which is rotatably supported by inner housing 17. As shown in FIGURES 3 and 4 of the drawings, pinion gear 101 engages with gear 102 which is attached to shaft 103. Shaft 103 is rotatably supported in carriage 104, and shaft 103 has two threaded portions that engage with forked arms 105 and 106. The two threaded portions are threaded in opposite directions and any rotation of shaft 103 will cause forked arms 105 and 106 to move in opposite directions and at the same rate of travel. A guide rod 107, which is attached to carriage 104, slidably engages forked arms 105 and 106 in order to prevent any rotational movement of the forked arms due to the rotation of shaft 103.

Eyepieces 24 and 25 are mounted in separate carriages 111 and 112 which are slidably mounted on guide rods 26 and 114. Guide rods 26 and 114 are attached to the outer housing 16. Carriages 111 and 112 are provided with tongues 115 and 116 that engage with forked arms 105 and 106, respectively. It can readily be seen that when knob 83 is pushed in, rotation of knob 83 causes pinion gear 101 to be rotated which, in turn, causes rotation of shaft 103 and, consequently, movement of the eyepieces by the forked arms which are threadedly engaged with shaft 103.

X-Scan Control

The purpose of the X-scan control is to laterally move the carriage 104, and, consequently, both eyepieces 24 and 25, relative to the lens-prism assemblies 22 and 23. A guide rod 121 that is attached to the inner frame 17 slidably supports carriage 104, and a shaft 122, which is rotatably supported by the inner housing 17, threadedly engages carriage 104. A knob 123 is attached to one end of shaft 122 and rotation of knob 123 causes lateral movement of the carriage 104. As shown in FIGURES 1 and 4 of the drawings, gear 102, which is carried by carriage 104, slides relative to the wide pinion gear 101 but the teeth remain in engagement. A forked arm 124 is attached to carriage 104 and engages with a tongue 125 which is attached to a headrest support 126.

Operation

In operation, with the film 11 being in the bottom, or projector compartment, the X and Y-scans can be first adjusted for proper operation of the stereoscope. For Y-scan, rotation of knob 20 adjusts the length of the jack screw 21 that is engaged with the inner housing 17, and as the jack screw raises or lowers one end of the inner housing 16, the other end pivots about shaft 18. The Y-scan motion moves the images, which are examined by the eyepieces 24 and 25, up and down, while the eyepieces remain stationary. As one end of the inner housing 16 is raised or lowered by rotation of knob 20, the forked arms 105 and 106 are able to slidably move relative to tongues 115 and 116, respectively, and thus no change in the interocular setting of eyepieces 24 and 25 take place.

For X-scan, rotation of knob 123 causes lateral movement of carriage 104, and, consequently, lateral movement of eyepieces 24 and 25. Both eyepiece move in the same direction and an equal distance. Gear 102, which is carried by carriage 104, slidably moves along the wide pinion gear 101 and although the teeth remain in engagement there is no rotation between gears 101 and 102. Consequently, there is no rotation between gear 101 and gear 92 and, therefore, shaft 93 remains stationary. Thus there is no change in the interocular settings of eyepieces 24 and 25. When X-scan is zero, each eyepiece "looks" directly at the center of its image gimbal. When X-scan is greater than zero, the eyepieces have a fixed X-scan displacement left or right of the image gimbals.

Rotation of knob 44 adjusts the relative heights between the lens-prism assemblies 22 and 23 in order to correct for skew. The lens-prism assemblies move in opposite directions, that is, when assembly 22 is raised, assembly 23 is lowered. The gimbal arms 94 and 95 and link 96 permit the raising or lowering of the lens-prism assembly 22 without affecting the setting of the overlap control, and likewise, gimbal arms 95 and 99 and link 98 permit the raising or lowering of the lens-prism assembly 23 without affecting the setting of the overlap control.

Rotation of knob 61 can perform two functions. In its normally "out" position, rotation of knob 61 angularly aligns the left image to the right, and when knob 61 is pushed "in" and rotated, both lens-prism assemblies are rotated to find maximum stereo. As the optical elements of the lens-prism assemblies 22 and 23 are mounted in inner barrels, rotation of these inner barrels to accomplish the desired effect does not affect the other controls.

Knob 83 performs two functions. When pulled "out," rotation of knob 83 changes the overlap as seen by the operator through the eyepieces 24 and 25, and when pushed "in" rotation of knob 83 adjusts the separation of the eyepieces 24 and 25. Also, when knob 83 is pushed "in" and rotated, a corrective movement is fed into the overlap mechanism in order to prevent a change of overlap as seen by the operator.

When knob 83 is pulled "out," gears 91 and 92 become disengaged and rotation of knob 83 rotates sprocket 87, which in turn causes rotation of shaft 82 through chain 89 and sprocket 88. As shaft 83 rotates, carriages 33 and 34 move laterally, in opposite directions, and carry lens-prism assemblies 22 and 23. Thus by rotation of knob 83, the lateral separation of lens-prism assemblies 22 and 23 can be varied.

When knob 83 is pushed "in" and rotated, three changes are made. The separation of the eyepieces 24 and 25 is changed. The separation of the lens-prism assemblies 22 and 23 is changed, and also, the image-gimbal centers are changed. The movement of the eyepiece 24 is accomplished by means of gears 91, 92, 101, 102, and shaft 103 which actuates forked arm 105 to move carriage 111, and the movement of eyepiece 25 is accomplished by means of gears 91, 92, 101, 102, and shaft 103 which actuates forked arm 106 to move carriage 112. As gear 92 is attached to shaft 93, rotation of gear 92 also causes shaft 93 to be rotated and thus move gimbal arms 94 and 95 equal distances, but in opposite directions. Rotation of knob 83 also causes lateral movement of the lens-prism assemblies 22 and 23, and this lateral movement of lens-prism assemblies 22 and 23 in conjunction with the lateral movement of gimbal arms 94 and 95 insures that the optical axes of each lens system continue to "pierce" the film in the same left and right points during the change of interocular. The piercing points are changed only when the overlap is changed.

The resulting stereo picture that the operator sees is right reading and right side up relative to the picture that the projector in the lower compartment projects onto a screen. It can be seen from the foregoing description that all the controls are designed to be independent of one another and that changing any one control does not disturb any other control.

Obviously many modifications and variations of the present invention are possible in the light of the above teachings. It is therefore to be understood, that within the scope of the appended claims, the invention may be practiced otherwise than as specifically described.

What is claimed is:

1. A stereoscopic viewer for viewing stereo images which are in fixed relation to each other on their mounts comprising:
    an outer frame,
    an inner frame pivotally mounted to said outer frame,
    a drivable shaft rotatably supported by said inner frame,
    first and second carriages threadedly engaging said drivable shaft,
    left and right lens systems each comprising an eyepiece and a lens-prism assembly, each said eyepiece being separately slidably supported by said outer frame, and one said lens-prism assembly being pivotally connected to said first carriage and the other said lens-prism assembly being pivotally connected to said second carriage,
    mirror means for reflecting images to said left and right lens systems, and
    shiftable means for selectively adjusting the spacing between said first and second carriages when said shiftable means are in a first position, and for simultaneously adjusting the spacing between said first and second carriages, adjusting the spacing between said eyepieces, and pivotally moving said lens-prism assemblies relative to the respective carriages to which each said lens-prism assembly is pivotally connected when said shiftable means are in a second position.

2. A stereoscopic viewer for viewing stereo images as set forth in claim 1 wherein each said lens-prism assembly is adjustable in elevation relative to the respective carriage to which said lens-prism assembly is connected.

3. A stereoscopic viewer for viewing stereo images as set forth in claim 1 wherein adjustable means are provided for pivotally moving said inner frame relative to said outer frame.

4. A stereoscopic viewer for viewing stereo images as set forth in claim 1 wherein said shiftable means includes:
    a two-piece coupled shaft rotatably supported by said inner frame,
    a gear attached to one piece of said coupled shaft,
    sprocket and chain means connecting the other piece of said coupled shaft and said drivable shaft, and
    gear train means for simultaneously moving said eyepieces relative to said inner frame, said gear train means being drivably engageable with said gear attached to one piece of said coupled shaft.

References Cited in the file of this patent

UNITED STATES PATENTS

| | | |
|---|---|---|
| 731,405 | Dickson | June 16, 1903 |
| 749,046 | Folmer et al. | Jan. 5, 1904 |
| 1,850,153 | Paroselli | Mar. 22, 1932 |
| 2,371,999 | Isaacson | Mar. 20, 1945 |
| 2,378,937 | Leeds | June 26, 1945 |
| 2,866,382 | Gruner et al. | Dec. 30, 1958 |

FOREIGN PATENTS

| | | |
|---|---|---|
| 599,029 | Great Britain | Mar. 3, 1948 |